June 21, 1955  H. FRIEDMAN  2,711,480
METHOD OF MEASURING THICKNESS OF THIN LAYERS
Filed June 29, 1948
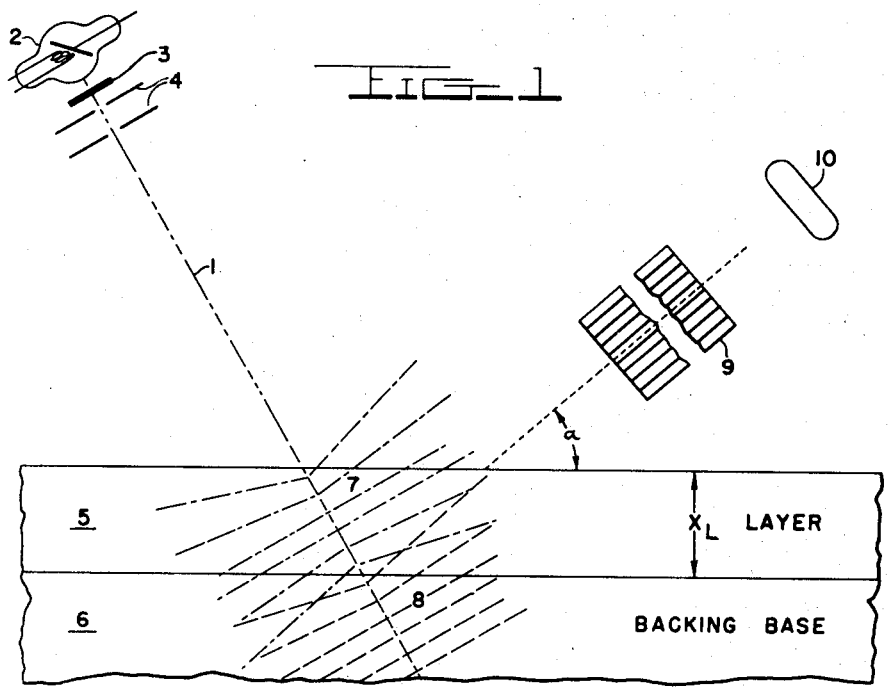
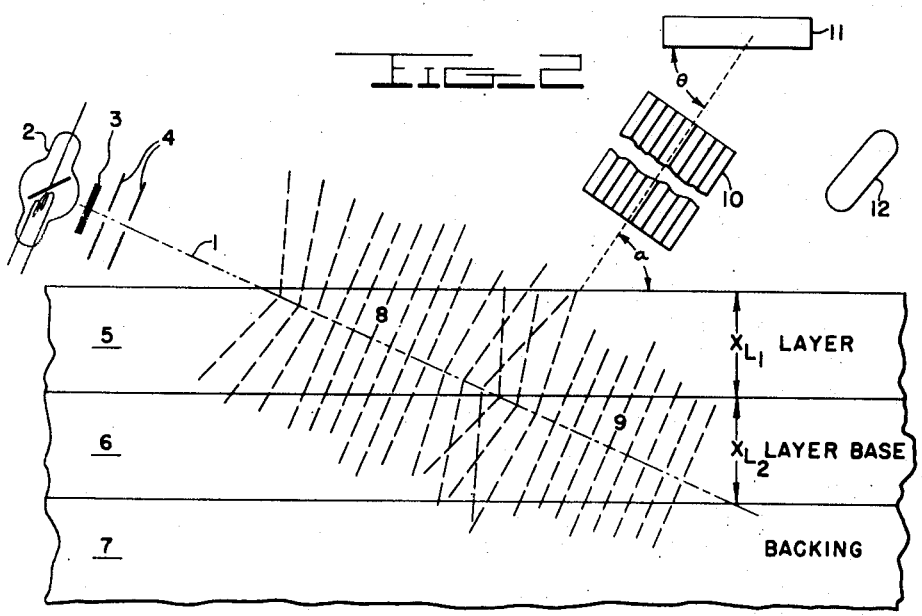
INVENTOR.
HERBERT FRIEDMAN
BY
ATTORNEY United States Patent Office 2,711,480
Patented June 21, 1955

2,711,480

METHOD OF MEASURING THICKNESS OF THIN LAYERS

Herbert Friedman, Arlington, Va.

Application June 29, 1948, Serial No. 35,958

10 Claims. (Cl. 250—51)

(Granted under Title 35, U. S. Code (1952), sec. 266)

This invention relates to the measurement of thicknesses of thin layers of materials disposed on different base materials in the form of either heavy backings or other thin layers.

The prior art of measuring thin layers of material, of which metallic coatings are a typical example, includes mechanical micrometric measurements, indirect chemical methods involving solution of the coating material, and magnetic measurements. The chief limitations of such methods lie in the degree of accuracy attainable and in operational disadvantages, the latter sometimes being critical when destruction of the specimen is necessary.

In U. S. Patent 2,428,796, issued to me, October 14, 1947, I disclosed a non-destructive method of measuring thicknesses of thin layers of material disposed on a crystalline backing material. That method comprised measuring the absorption of primary X-ray radiation due to transmission through the thin layer, said radiation being reflected by the crystal lattice of the underlying backing material. The present invention also involves the use of X-rays, but proceeds upon an entirely different principle and possesses several distinct advantages not found in any of the older X-ray methods. These advantages will hereinafter appear from the description of the invention.

It is the principal object of my invention to provide a non-destructive method of measuring the thickness of thin layers of materials.

It is a secondary object of my invention to provide a method of measuring the individual thicknesses of several thin layers of different materials superimposed on one another.

The particular object of the invention is to provide such a method as will be independent of crystallographic reflection from an underlying material and instead, depend only on the chemical nature of said material.

A still further object of my invention is to provide an X-ray absorption method of measuring thin layers in which the wave-length of the X-rays measured will be sharp and the presence of "white radiation" background in the pattern will be substantially eliminated.

Further objects will in part be obvious and in part hereinafter appear.

My invention comprises the method of measuring thin layer thicknesses by measuring the absorption, by the layer or coating material, of the fluorescent X-radiation emanating from a different, immediately underlying base material. Essentially, it makes no difference whether said base material is a heavy backing or merely another thin layer.

Furthermore, it makes no difference whether said base material (heavy backing or thin layer) be of crystalline or non-crystalline nature. This fact constitutes an important distinct from my invention disclosed in U. S. Patent 2,428,796.

A better understanding of my invention will be had by consideration of its theoretical aspects in conjunction with reference to the accompanying drawings, in which Fig. 1 is a schematic diagram of the practice of my invention as it may be employed with certain favorable combinations of coating or layer material and base material. Fig. 2 is a schematic diagram illustrating the practice of my invention with more than one coating or layer and with any combination of materials. Figure 1 shows a special application and Fig. 2, a general one.

Fig. 1 shows a thin layer of material disposed on a relatively heavy backing material. An example of a favorable (and very common) combination or pair of materials which could constitute the pair in Fig. 1 is that of tin plate (layer) on iron (base). Postulating for purposes of illustration this pair of materials in Fig. 1, the operation of the invention may be described as follows:

An intense beam of polychromatic or "white radiation" X-rays 1 is emanated from source 2 and transmitted through a suitable filter 3, designed to remove most of the softer (longer wave-length) radiation. The source 2 for exciting fluorescence in the base material may be any conventional source intended for this purpose such as that disclosed in my earlier copending application Serial No. 684,908 filed July 19, 1946, now U. S. Patent 2,449,066 issued September 14, 1948 wherein an X-ray tube is used as a source, the tube having a copper target and operating at voltages between 20 and 50 kv depending upon the intensity of radiation to be used. This is to prevent the possible reflection of any but high-frequency primary radiation from the specimen to the detector. As will appear below said high-frequency reflected radiation will not interfere with operation of the invention. The radiation is then collimated by slit system 4 and transmitted through the tin plate coating 5 and into underlying iron base 6. During its transmission the energy of this primary radiation is partly absorbed by both of the penetrated materials, and in this absorption process various types of secondary radiations are generated in the absorbing materials. The most important type of secondary radiation is the so-called "fluorescent radiation" which is shown schematically as 7 for the tin plate coating and 8 for the iron base. It emanates in all directions from the affected atoms of the penetrated absorbing material, and is characteristic of said atoms. Furthermore, this fluorescent radiation is identical in quality (wavelength) with the characteristic radiation which would be emitted if the absorbing material were a target (anode) in an X-ray tube. Thus, different characteristic fluorescent radiations occur in each of the absorbing materials corresponding to the K-series, L-series, M-series, etc. line spectra which are emitted when those materials are used as targets. This fluorescent radiation is not to be confused with other types of secondary radiation which may occur during absorption such as "scattered radiation" whose wavelength is associated with that of the primary beam rather than being a function of the absorbing material. It is also pointed out that the phenomenon, being entirely atomic, is completely independent of the physical structure, condition or state of aggregation of the absorbing material.

In Fig. 1, the tin plate is shown to be emitting fluorescent radiation 7 of two relatively widely separated wavelengths (length of the dashes schematically representing wavelength) which constitute the K- and L-series line spectra of that element. These wavelengths are about 0.5 Å. and 3.6 Å., respectively (taking the strongest unresolved line of each series). The iron base is shown emitting fluorescent radiation 8 of one wavelength, the $K_a$ at about 1.9 Å. Of course, other line spectra of iron as well as tin will be generated, but their wavelength will be so large that their penetration, even of air, will be negligible.

Fluorescent radiations from both the coating and the base material leaving their respective sources at arbitrary given angle, α, will enter collimator 9 and impinge on detector 10. In the drawing, collimator 9 is deliberately disposed in a skew position with respect to the direction of the primary beam. This is to avoid the misleading suggestion that the fluorescent radiation emanates only perpendicular to the direction of the primary beam in which case the positioning of the collimator (angle $\alpha$) would be critical, as it is in my aforementioned previously disclosed invention. The introduction of this additional mechanical degree of freedom constitutes another advantage of the present invention.

It is not necessary even to restrict angle $\alpha$ to a value different than that of the angle of diffraction of the primary beam, since due to the original filtering any reflected primary radiation entering the collimator will be of too short a wavelength to affect the detector.

The detector 10 man consist of any radiation-intensity measuring means having a suitable spectral sensitivity curve; that is one which is highly sensitive to radiation of the quality being measured and relatively insensitive to radiations in the adjoining wavelength regions. The selection or design of such measuring means is fully within the skill of one familiar with the art. I find an argon-filled Geiger-Mueller counter equipped with appropriate measuring circuit, very satisfactory for investigating tin plate on iron. Other means which could be adapted for use in my invention include the ionization chamber, fluorescent screen and photomultiplier tube, and photographic plate.

The detector 10 is disposed in the path of fluorescent radiation from both the layer and base material, its actual size, as well as that of the collimator 9, being much larger with respect to the coating thickness than the schematic drawing indicates. However, in accordance with the prescribed spectral sensitivity-distribution, it is selected or designed to be practically insensitive to the short wavelength K-series emission of tin coating and to any high-energy (short wavelength) radiation which might be reflected to it. Moreover, the longer wavelength L-series spectrum will be completely absorbed by the air and the casing of the Geiger-Mueller tube. The fluorescent iron emission, on the other hand, has a wavelength (frequency) to which the detector is very sensitive and which is short enough to penetrate strongly all the material between its generation-source and the tube. Thus the intensity of fluorescent radiation generated in the underlying base material can be measured by the detector with the exclusion of all other X-ray radiation.

Determination of the thickness, $x_L$, of a given coating or layer material can be readily made by measuring the relative intensities of fluorescent radiation from the base material reaching the detector with and without a layer of said material of thickness $x_L$ being interposed. Said determination involves the use of the exponential absorption law $$\frac{I_x}{I_0} = e^{-\mu \rho x}$$

where $I_x$ and $I_0$ are the respective said intensities, $\mu$ is the mass absorption coefficient of the material, $\rho$ its density and $x$, the distance in the absorber through which the radiation is transmitted. Having determined the relative intensities and knowing $\mu$ and $\rho$, which are readily available in the literature for most materials, the value of $x$ is easily calculated. From the elementary trigonometric relation, $x_L = x \sin \alpha$, the layer thickness is determined. Empirical determination of layer thickness can be made directly from intensity measurements with the aid of calibration curves for various materials, just as disclosed in my patent, U. S. 2,428,796.

Other favorable combinations of layer and base materials to which the practice of my invention as shown in Fig. 1 is applicable can be readily found by reference to tables of characteristic emission spectra of the various elements, or more simply, reference to the periodic table of elements. Thus, for example, a tin coating on a manganese base could be measured in this way, as could cadmium, silver or palladium coatings on an iron or manganese base. Also antimony or cesium on cobalt, nickel or copper constitute other favorable combinations. Since the L-series emission spectra is of shorter wavelength for the latter two coating materials, it may be necessary to place a thin aluminum foil filter in front of the detector to augment the glass and air absorption of these radiations.

If mechanically feasible, it is desirable to determine the intensities, $I_0$ and $I_x$ of the fluorescent radiation emitted by the base material before and after, respectively, the coating layer has been applied. However, the method is just as reliable if the intensity, $I_0$, is determined with a different, uncoated control specimen chemically identical to the coated base material. The only limitation is that the angle $\alpha$ be maintained constant in making both measurements. Since chemical identity is the only requirement for the control specimen, it could be in a different physical condition, e. g. cold worked, or even in a different physical state, e. g. liquid.

In the method of practicing my invention exemplified in Fig. 1, the primary beam is shown to be collimated. This is not an essential feature but one of convenience only, unless thickness is to be measured over a very small area. Thicknesses may be measured over areas as small as 1 square millimeter with my invention. (Note that a specimen area of 1 square millimeter would be large compared to the thickness of an ordinary coating layer.) For larger areas a divergent primary beam may be used. For flexibility, a variable-width slit system is recommended.

Having discussed the principles of my invention in connection with the special simple case exemplified in Fig. 1, I will proceed in connection with Fig. 2 to describe elavorated methods of practicing my invention which make it applicable to the general problem of determining thicknesses of several thin layers of any combination of materials.

In Fig. 2, elements 1, 2, 3, 4, 5 represent the primary beam of X-rays, the source, the filter, the slit system and the (top) coating layer respectively, just as in Fig. 1. Intermediate layer 6 constitutes the base material in that it is the source of the measured fluorescent radiation, and backing 7 fulfills the mechanical function of support. Primary beam 1 is made to impinge on the specimen (top layer 5) at a small angle, the maximum permissible size of which is a function of the thickness of the base material. The small angle is necessary to allow sufficient transmission of the primary beam through base material 6 to produce an adequate quantity of fluorescent radiation 9 in that material. Of course, fluorescence 8 is also produced in the coating layer 5, and fluorescent radiation from both materials leaving the surface at angle $\alpha$, will enter collimator 10. If the coating and base layer materials happen to be one of the favorable combinations postulated in Fig. 1, the detector could be placed in the path of the collimated fluorescent radiation and the intensity of radiation 9 measured, exclusively. However, if the two layer materials have line emission spectra whose wavelengths are close together, it will be difficult or impossible to detect directly fluorescent radiation from one (the base material) without interference from fluorescent radiation of the other (top layer material) even if the detector's sensitivity-distribution curve has a relatively sharp peak. Furthermore, even if the two layer materials constitute a favorable combination, interference might arise from some fluorescent radiation generated in the heavy backing material if that material happened to have an emission spectrum similar to that of the base layer. Thus it is necessary, in the general case, to have some means of discretely selecting and measuring only that part of the total fluorescent radiation which emanates from the base material immediately underlying the layer or layers whose thickness is to be determined. This may be done crudely by methods based on conventional filtering theory, or precisely by use of a single crystal monochromator 11 (as in Fig. 2). The monochromator is mounted in the path of the collimated fluorescent radiation, and is variable with respect to the angle it makes with said path. When this crystal is set at an angle $\theta$ which satisfies the Bragg equation $$2d \sin \theta = n\lambda$$

for the value of $\lambda$ equal to the wavelength of the $k\alpha$ emission line radiation of the base material, $d$ being a constant for the crystal and $n$ the order of reflection (which can always be regarded as equal to 1, the other orders being of negligible intensity), the crystal monochromator will reflect only that radiation to detector 12. The intensities, $I_0$ and $I_x$, can then be readily measured and thickness $x_{L_1}$, determined as described above in connection with Fig. 1.

The thickness of the intermediate layer 6 in Fig. 2 can subsequently be determined by causing the primary beam 1 to impinge upon the specimen at a relatively high angle and thus penetrate deeply into the heavy backing material. This material then generates a characteristic fluorescent emission spectrum which will be partially absorbed in passing through the two upper layers of material, and whose intensity can be measured, exclusively, by employing the monochromator as above. From the ratio of intensities, the total distance through which transmission took place may be determined from the absorption law in the following form $$\frac{I_{x_1+x_2}}{I_0} = \left(e^{-\mu_1 \rho_1 x_1}\right)\left(e^{-\mu_2 \rho_2 x_2}\right)$$
$$= e^{-(\mu_1 \rho_1 x_1 + \mu_2 \rho_2 x_2)}$$

From this equation, knowing the four materials constants and having determined $x_1$ in the process of finding $x_{L_1}$, $x_2$ is readily calculated and from the trigonometric operation, $x_{L_2}$, the thickness of the intermediate layer, is determined. If a third layer were present, the combined thickness of the upper two could be determined as just described, by selecting an impingement angle suitable for sufficient transmission through the third (base) layer. Subsequently, the combined thickness of the three layers could be determined by using the heavy backing as a fluorescing base material and carrying out similar calculations. The process could be repeated thusly, until an impractical depth would be reached. Of course, the penetrating power of the primary beam can be increased, within limits, by raising the tube voltage of the source.

The invention is equally applicable to curved as well as plane surfaces. The only requirement is that the surfaces of the layer and base material be parallel (thickness uniform) over the area investigated. In working with curved surfaces, it is desirable to have the collimator disposed with its axis perpendicular to the surfaces of the layer or layers so that $x$ in the exponential absorption law equals $x_L$ for all elements of the fluorescent beam entering the collimator. Thus use of the trigonometric relation and integration for the proper value of $\alpha$ are avoided. The same result could be accomplished by using a slit instead of a tubular collimator.

The term thin layer occurring in this specification is used broadly, both as to dimension and physical nature. Thus it applies to the range of thicknesses from in the order of $10^{-7}$ centimeters to in the order of $10^{-2}$ centimeters, the maximum practical thickness being largely a function of the quality (wavelength) of the fluorescent radiation emitted by the base material. Layer is intended as a term independent of the physical nature or manner of disposition and thus includes liquid films, and solids in various states of aggregation and division, disposed on the base material by coating, plating, dipping, painting, sputtering, condensations, etc. It also includes thin foils disposed on the base material with no mechanical adherence, and flowing liquids.

Furthermore, there is nothing to restrict either the layer material or base material to single chemical elements, as long as the same element is not present in both layer and base. If the layer material consists of a compound or mixture, intensity calculations must take into account $\mu$ and $\rho$ values for all elements present, in the manner disclosed in my patent U. S. 2,428,796. If the base material consists of more than one element, the single-crystal monochromator can be set to select the fluorescent radiation from the component present in the largest quantity.

The foregoing examples are intended to be illustrative only and not limitative beyond the extent defined by the herewith appended claims.

The invention described herein may be manufactured and used by or for the Government of the United States of America for governmental purposes without the payment of any royalties thereon or therefor.

What is claimed is:

1. The method of determining the thickness of a thin layer of material on a chemically different base material which comprises, directing a beam of X-rays through the layer material and into the base material, selecting the fluorescent radiation from the base material which has been transmitted through the layer material and determining its intensity, and comparing its intensity with the intensity of the fluorescent radiation from a control for the base material.

2. The method of determining the thickness of a thin layer of solid material on a chemically different base material which comprises, directing a beam of X-rays through the layer material and into the base material, selecting the fluorescent radiation from the base material which has been transmitted through the layer material and determining its intensity, and comparing its intensity with the intensity of the fluorescent radiation from a control for the base material.

3. The method of determining the thickness of a thin metal layer on a chemically different base material which comprises, directing a beam of X-rays through the layer material and into the base material, selecting the fluorescent radiation from the base material which has been transmitted through the layer material and determining its intensity, and comparing its intensity with the intensity of the fluorescent radiation from a control for the base material.

4. The method of determining the thickness of a thin non-ferrous metal layer on a ferrous metal base which comprises, directing a beam of X-rays through the layer material and into the base material, selecting the fluorescent radiation from the base material which has been transmitted through the layer material and determining its intensity, and comparing its intensity with the intensity of the fluorescent radiation from a control for the base material.

5. The method of determining the thickness of a tin coating on a ferrous metal base which comprises, directing a beam of X-rays through the coating and into the base material, selecting the fluorescent radiation from the base material which has been transmitted through the coating and determining its intensity, and comparing its intensity with the intensity of the fluorescent radiation from a control for the base material.

6. The method of determining the thickness of a thin layer of material on a chemically different base material which comprises, directing a beam of X-rays through the layer material and into the base material, collimating the fluorescent radiation transmitted through the layer material, directing the collimated fluorescent radiation to the surface of a crystal which is set at an angle to the beam such that it will reflect only the fluorescent radiation coming from the base material, determining the intensity of this reflected fluorescent radiation, and comparing it with the intensity of the fluorescent radiation from the base material alone.

7. The method of determining the thickness of individual thin layers of chemically different materials superimposed one on another in a specimen which comprises, directing a beam of X-rays through the first layer and into the second layer, selecting the fluorescent radiation from the second layer which has been transmitted through the first layer, determining its intensity, and comparing it with the intensity of the fluorescent radiation from a control for the second layer, directing a beam of X-rays through the first and second layers and into the third layer, selecting the fluorescent radiation from the third layer which has been transmitted through the first and second layers, determining its intensity, and comparing it with the intensity of the fluorescent radiation from a control for the third layer, and repeating the procedure for determining the thickness of further underlying thin layers.

8. The method of determining the thickness of a thin metal layer on a different metal base in a specimen, which comprises, directing a beam of X-rays through the layer and into the base, collimating fluorescent radiation emanating from the specimen through the layer, intercepting the collimated beam with a crystal which is set at an angle to the beam such that it will reflect only fluorescent radiation from the base, determining the intensity of the fluorescent radiation, and comparing it with the intensity of the fluorescent radiation from a control for the base.

9. In an apparatus for determining the thickness of a layer material superposed on a chemically disparate base material, the combination of means to direct a beam of X-radiation upon the base material with the superposed layer thereon to effect X-ray fluorescence thereof, a collimator disposed with respect to said base material to collect fluorescent radiation emanating therefrom through the superposed layer and a detector disposed to intercept the fluorescent radiation collected by said collimator, said detector having a predetermined spectral distribution characteristic and being substantially insensitive to fluorescent X-radiation emanating from the layer material and sensitive to the fluorescent X-radiation emanating from the base material to enable comparison of the extent of detected radiation in the absence of said layer with that in the presence of said layer.

10. In an apparatus for determining the thickness of a tin layer superposed on an iron base, the combination of means to direct a beam of X-radiation upon the base with the superposed tin layer thereon to effect X-ray fluorescence thereof, a collimator disposed with respect to said tin coated iron base to collect fluorescent X-radiation emanating therefrom through the tin layer and a detector disposed to intercept the fluorescent radiation collected by the collimator, said detector having a predetermined spectral distribution characteristic and being substantially insensitive to fluorescent X-radiation emanating from the tin and sensitive to the fluorescent X-radiation emanating from the iron.

References Cited in the file of this patent

UNITED STATES PATENTS

| 2,079,900 | Cohn | May 11, 1937 |
| 2,277,756 | Hare | Mar. 31, 1942 |
| 2,418,029 | Hillier | Mar. 25, 1947 |
| 2,449,066 | Friedman | Sept. 14, 1948 |
| 2,521,772 | Beeghly | Sept. 12, 1950 |

OTHER REFERENCES

Review of Scientific Instruments, Mar. 1946, pp. 99–101, by H. Friedman and L. S. Birks.

Refinery Electronics by Vin Zeluff, Scientific American, Nov. 1945, pp. 278–280.